(12) United States Patent
Thomas

(10) Patent No.: US 11,352,242 B2
(45) Date of Patent: Jun. 7, 2022

(54) REMOVABLE LIFTING PLATFORM WITH CLAMPING LIFT PAD AND MOBILE LIFT CADDY

(71) Applicant: Marc S. Thomas, Brownville, NY (US)

(72) Inventor: Marc S. Thomas, Brownville, NY (US)

( * ) Notice: Subject to any disclaimer, the term of this patent is extended or adjusted under 35 U.S.C. 154(b) by 703 days.

(21) Appl. No.: 16/376,447

(22) Filed: Apr. 5, 2019

(65) Prior Publication Data

US 2020/0317482 A1 Oct. 8, 2020

(51) Int. Cl.
*B66F 7/28* (2006.01)
*B60P 7/08* (2006.01)
*F16M 13/02* (2006.01)

(52) U.S. Cl.
CPC ........ *B66F 7/28* (2013.01); *B60P 7/08* (2013.01); *F16M 13/02* (2013.01); *B66F 2700/123* (2013.01)

(58) Field of Classification Search
CPC ........ B60P 7/08; B66F 2700/123; B66F 7/26; B66F 7/28; F16M 13/02
See application file for complete search history.

(56) References Cited

U.S. PATENT DOCUMENTS

| | | | |
|---|---|---|---|
| 4,134,475 A | 1/1979 | Jones | |
| 4,287,965 A | 9/1981 | Pearson et al. | |
| 6,814,342 B1 | 11/2004 | Perlstein et al. | |
| 9,889,787 B2 | 2/2018 | Thomas | |
| 2017/0297472 A1* | 10/2017 | Thomas | B66F 9/07577 |
| 2018/0201490 A1* | 7/2018 | Ringler | B66F 7/28 |

* cited by examiner

*Primary Examiner* — Tyrone V Hall, Jr.
(74) *Attorney, Agent, or Firm* — Bernhard P. Molldrem, Jr.

(57) ABSTRACT

An automotive lift system includes at least one stationary primary lift and a mobile lift caddy configured to remove a vehicle from a primary lift while the vehicle is elevated above the workplace floor and then transport the vehicle to another location. The lift system employs detachable pivotable lift arms that are removably attached to the lift arms of the primary lift, and which can transfer to the lift caddy. Also, the lift caddy may have clamp lift pads that can be used to remove the vehicle from the primary lift and either also remove the pivot lift arms or not remove the pivot lift arms. This system can also be used on existing primary lifts.

14 Claims, 19 Drawing Sheets

FIG. 13
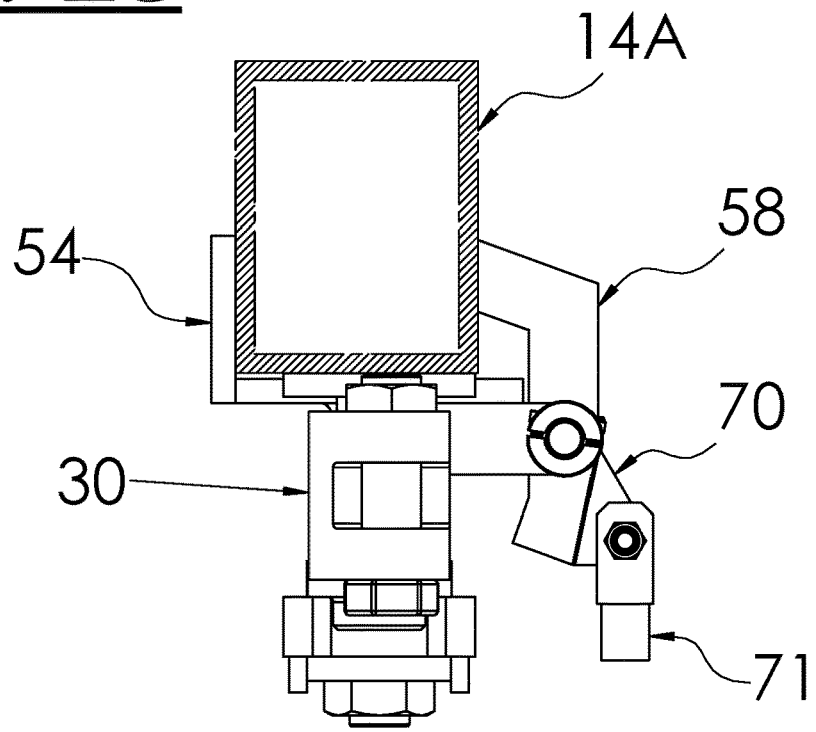
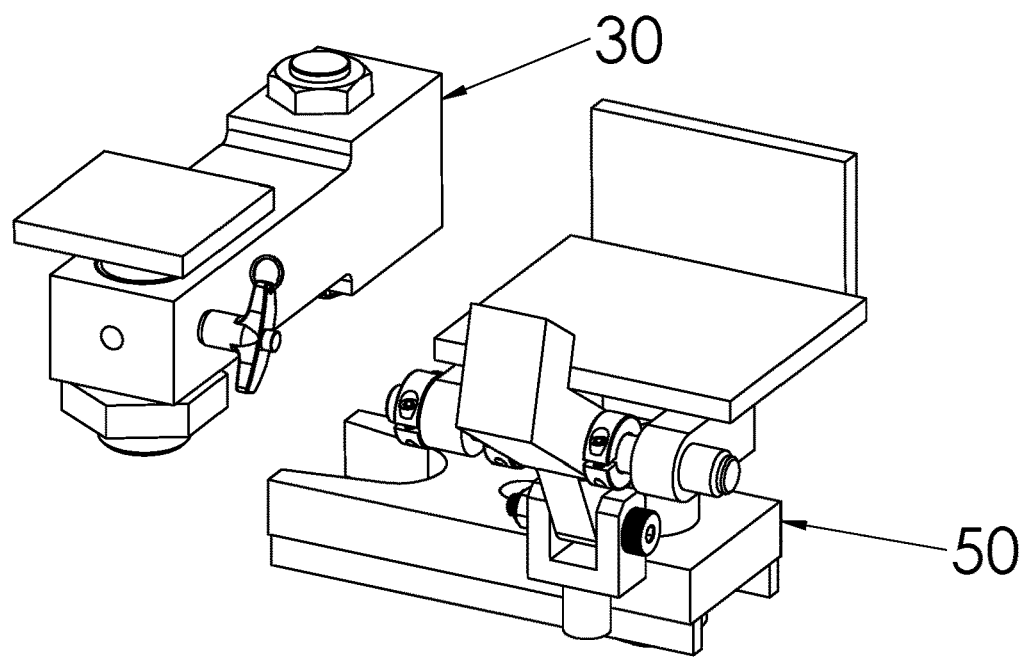
FIG. 14

FIG. 17
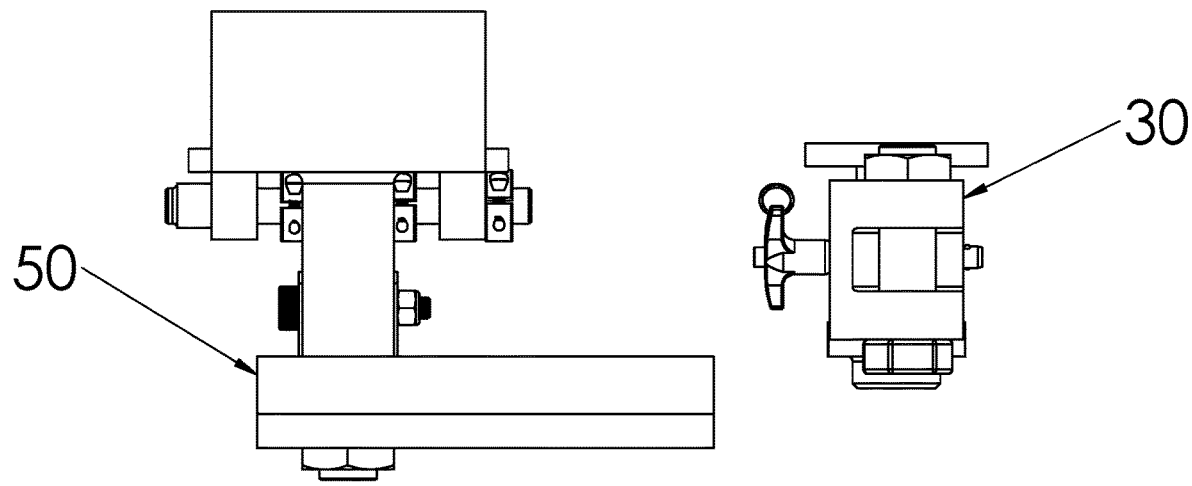
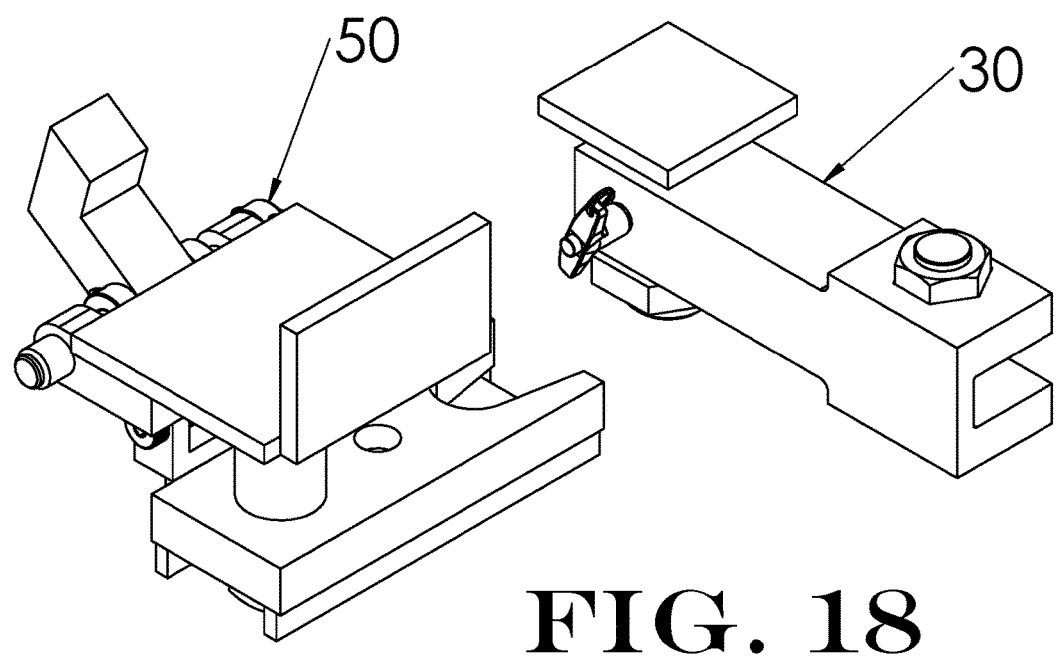
FIG. 18

REMOVABLE LIFTING PLATFORM WITH CLAMPING LIFT PAD AND MOBILE LIFT CADDY

BACKGROUND OF THE INVENTION

This invention relates to hoists and lifts for raising a motor vehicle above the floor of a workplace, and is more particularly concerned with lift systems that include mobile lift caddy and transport devices for a transferring a vehicle from a primary lift to another location. The invention is particularly concerned with a lift pad arrangement in which the primary lift employs modular removable pivot arms. These are adapted to be attached removably onto an end of a lift arm of a stationary (i.e., primary) vehicle lift. These have vehicle lift pads that are positioned at one end, with the other end being pivotally mounted into (or onto) the respective lift arm of the primary lift. The mobile lift and transport caddy has structure that can mate with a pivot lift pad receiver aligned with the lift to remove the vehicle off the primary lift and free the primary lift for other work.

Alternatively, the invention relates to a clamp lift pad assembly removably disposed upon a caddy lift arm (or post) of a mobile lift caddy and which is configured for removing a vehicle from a primary lift and carrying the vehicle to a location away from the primary lift. The primary lift having a plurality of lift arms, these clamp lift pad assemblies have a lift pad that engages a lift point on the vehicle, so that the mobile lift caddy can lift the vehicle off the primary lift without having to engage the primary lift lifting pads.

The basic arrangement of a stationary primary lift and mobile lift caddy is described and as illustrated in my earlier U.S. Pat. No. 9,889,787, granted Feb. 13, 2018, and which is incorporated herein by reference.

Automotive repair shops and automotive body shops employ lifts or hoists to raise the vehicle above the workplace floor for allowing the workers access to the lower portions of a vehicle or to relieve weight from the vehicle suspension to permit repairs to wheels, brakes, etc. It frequently occurs that an automotive repair is only partly completed when the work need to be interrupted, e.g., to await arrival of a replacement part. When that happens the lift or hoist can be tied up and idled, and not be available for repairs or maintenance to another vehicle. However, the partly-repaired vehicle cannot simply be lowered from the lift and moved on its own wheels, especially if it is missing some portion of its suspension.

Accordingly, in my earlier U.S. Pat. No. 9,889,787 I proposed an auxiliary lift or caddy to remove the partly-repaired vehicle from the primary lift and permit that primary lift to be available for repair of another vehicle. The auxiliary lift or caddy is also able to move the first vehicle back to the primary lift so that repairs or maintenance on it can be continued. Once the first vehicle has been removed from the lift, the lift arms have to be made ready to support the second vehicle needing repair or maintenance.

OBJECTS AND SUMMARY OF THE INVENTION

Accordingly, it is an object to provide an improved mechanism for transfer of the vehicle that is on the hoist or lift onto the lift caddy, and thereafter to transfer the vehicle back to the main stationary lift or primary lift.

A more specific object of this invention is to provide a lift arm attachment, either as a pivoted lift arm assembly that attaches to the lift arm of the stationary lift, or a lift pad and clamp that attaches onto the lift members of the lift caddy.

Another object is to provide the lift system which give the vehicle repair technician the option of using transferable lift pads or support pads or to use separate support pad members to allow the mobile machine or caddy to pick up the lift pads and vehicle directly from the lift, or to pick up the vehicle only and leave the primary lift pads in place.

A general concept of the invention involves a pivot lift arm assembly and a lift pad and clamp, which may be used in connection with a lift pad and mounting bracket.

The pivoting lift arms may be easily removed from the stationary lift by detaching them from the lift after being engaged with the mobile auxiliary lift caddy, and then rotating them away from the stationary lift arms after a lift arm locking pin is removed. This component remains with the lift caddy and can swing back into place later into the respective lift arm of the primary lift. The pivot lift arm remains in place on the lift caddy until the vehicle is returned to the primary lift. In this instance, the repair service shop is provided with a number of sets of these pivoting lift arms so that a set can be installed for the second vehicle when the first vehicle has been removed by the lift caddy from the principal or main stationary lift.

A lift pad and mounting bracket has a dual purpose design with multiple functionalities.

The purpose of the lift pad and mounting bracket is to make it unnecessary to contact the primary lift's lift pads, or alternatively to engage the primary lift's lift pads. The lift pad and mounting bracket accomplishes this by supporting the vehicle chassis directly, making the overall design and use of the lift caddy much more flexible. The lift pad and mounting bracket can interact with the main lift pivot arm assembly, or can remove the vehicle from the lift onto the caddy without interacting with the primary lift support pads, or with the pivot arm assembly.

Favorably, the caddy or mobile machine is a self-powered, remotely controlled unit, with a structural frame or chassis, wheeled or tracked mobility, and a power system for working the caddy lift arms and for the mobility of the caddy and mobility. In one preferred arrangement, a rechargeable electrical system powers hydraulic pumps and independent motors, as well as electronics and one or more caddy lift arms, which can be moved by hydraulic ram or by a threaded lead screws that interact with threaded portions of the caddy lift arms for positioning each of the receptacle members of the respective caddy lift arms to align the receptacle members with the associated lift pad assemblies. The caddy lift members can be manually actuated, in some cases, or may be pneumatically driven, i.e., with compressed air motors to drive the support structure. These lift members may in some embodiments be of a fixed height, allowing the main stationary lift to raise or lower the vehicle as needed. The caddy lift members each may include a pair of fore-aft linear adjustment lead screws and a pair of lateral adjustment lead screws coupled to associated threaded portions of the caddy lift arms, with precise positional adjustments. The control arrangement for mobility of the caddy and for operating the caddy lift arms can include a control module either wired to the caddy or connected wirelessly. In some cases the control module may be on the chassis of the mobile caddy.

Control logic for the mobile lift caddy may be mechanical, electrical, pneumatic, or fluid based, or a hybrid system combining these. The caddy can be operated by physically engaging the controls or by remote operation of the controls. Precise adjustment for the caddy lift arms may be accomplished in a number of ways, such as gears, lead screws, V-belts, indexed electrical motor drive, fluid powered devices, or other techniques. Positioning of the chassis lift arms in relation to the transferable lift pads on the lift arms of the primary lift can be accomplished using a vision sensor system, a proximity sensor system, or by using pre-established data related to the make and model of the customer's vehicle. The mobile machine or caddy may achieve mobility using wheel drive, a tracked drive system, sled, rails, etc. A battery-powered fluid drive is preferred as the power source for the mobility and lift functions of the lift caddy, but other power sources may be used if desired, such as electric motor drive or an internal combustion engine contained in the chassis of the lift caddy.

A video system with camera(s) mounted on the lift equipment allows for sensing obstructions or personnel in the path of the lift caddy when approaching the lift or when removing the vehicle from the lift to a storage location. This can employ artificial intelligence systems to halt the vehicle or change directions as need be to avoid an obstruction. A digital 3-D image of the vehicle maintenance and repair space can assist in locating the lift caddy vehicle properly in respect to a vehicle on the primary lift, or to can assist in transfer of the caddy and vehicle back onto the primary lift.

According to one aspect of this invention, a removable load bearing pivot arm is configured or adapted to be attached removably onto the end of a lift arm of the primary or stationary vehicle lift. Favorably the load-bearing pivot arm is constructed as a member having an upper elongated plate, a lower elongated plate, and a side flange joined to the upper and lower plates and with them defining an elongated open channel extending from a proximal end to a distal end of the pivot arm. A separate structural member may be used in place of a side flang which may or may not of unitary construction. The proximal end is configured so as to fit removably onto the end of primary lift's lift arm. A pivot lock pin is removably mounted into a bore formed in the proximal end of the pivot arm, and has male threads at one end and one or more grippable surfaces at the other end thereof to permit the pivot locking pin to be turned, e.g., a hexagonal configuration to receive a wrench. A female threaded member is mounted on a proximal end of the upper plate and serves for receiving the male threads at the (upper) one end of the pivot locking pin.

A lift pad assembly is positioned at the distal end of the load bearing pivot arm. This assembly includes a rotary bearing that is contained in the distal end of one or the other or both of the upper and lower plates. A shaft passes through the rotary bearing, with a load-bearing plate being mounted atop the upper end of the shaft. A pivot pad lift receiver is mounted at a lower end of the shaft and is adapted for receiving a lift member of a mobile lift caddy. Also, a removable retaining pin is removably inserted into a bore formed in the distal end of the load bearing pivot arm, and allows for releasably locking the shaft against rotation.

In a favorable embodiment, the pivot pad lift receiver has a lower generally cylindrical stub member adapted to fit into a female receptacle on the lift member of the mobile caddy. This pivot pad lift receiver can have a disk member above the generally cylindrical stub member and adjacent therewith, with the disk member having a diameter greater than the generally cylindrical stub member. The disk member can have one or more flat faces on a peripheral wall thereof such that it is adapted for receiving a turning tool such as a hex wrench. Also, the proximal end of the upper plate can have a hexagonal recess, and a hex nut removably disposed in that recess.

Alternatively, a clamp lift pad assembly can be removably disposed upon each caddy lift arm of the mobile lift caddy, to configure the lift caddy for removing a vehicle from a primary lift and carrying such vehicle to a location away from the primary lift. In this case the clamp lift pad assembly should include a base member supported on a respective caddy lift arm for engaging a vehicle on the primary lift. A horizontal pad member can be supported on the base member, and has first and second side edges opposite one another, with a vertical wall member affixed on the first side edge of the horizontal pad member. A clamp yoke is affixed to the base member beneath the horizontal pad member, and has a journal end extending up to or past the aforementioned second side edge. A pivotal clamp member has a bar portion journaled in the clamp yoke at the journal end thereof and also has a finger extending from one end of the bar member towards the vertical wall member and moves towards it when the bar member is rotated to an engaged position. An actuator member which can be e.g., a manually operated toggle clamp, or pneumatic, hydraulic, or electrically driven, is coupled to an opposite end of the clamp member's bar member for controllably rotating the pivotal clamp member between its engaged and disengaged positions.

Favorably, the base member includes a notched plate with its notch at one end thereof being adapted to accommodate a removable load bearing pivot arm that is attached to one end of an associated lift arm of the primary lift.

In the clamp lift pad assembly, the base member may include a notched plate with a notch at one end thereof adapted to accommodate a removable load bearing pivot arm that is attached to one end of an associated lift arm of the primary lift. The actuator member may mounted on base member. The base member may also include a post upon which said horizontal pad member is affixed. Also, the bar member has a profile that generally shaped like the letter gamma, i.e., bent at the end of the base member.

The mobile lift caddy can be precisely positioned to align the receptacle members of the respective caddy lift arms with the associated auto body lift points or with the associated removable load bearing pivot arm so that the vehicle can be easily removed from the primary lift and transported, and later quickly returned to the primary lift. With only minor modifications to the primary lift arms, the mobile machine or caddy can be used with existing lift technology.

In favored embodiments, the actuator member may be mounted on the base member, and the base member has a post upon which the horizontal pad member is affixed. Preferably, the bar member has a generally gamma shaped profile, i.e., like the Greek letter gamma (Γ), so as to clamp onto an automotive support member of the vehicle when the bar member swings to its engaged position.

According to an aspect of the present invention, a vehicle lift arrangement employs one or more primary lifts, and one or more than one mobile lift vehicle or lift caddy. The primary lift is located at a work position, e.g., repair bay or service bay, on a workplace floor and is configured for lifting a vehicle vertically above the workplace floor. Each primary lift can be made up of a plurality of vertical lift posts (e.g., two or four), each having a lift arm or pair of lift arms extending laterally from its associated lift post, and each lift arm having a receptacle fixture therein supporting a removable vehicle lift pad. The primary lift has a mechanism for raising and lowering the associated lift arms, and in many cases an arrangement swinging or for moving the associated lift arm laterally. The primary lift is configured to position an associated vehicle lift pad at a predetermined vehicle lift point on the chassis of the vehicle.

The mobile lift caddy is adapted or configured for removing a vehicle from the primary lift while the vehicle is elevated above the workplace floor and then transporting the vehicle to another location.

The present invention is designed for provide a novel lift arrangement with a stationary lift to function with a mobile auxiliary lift caddy, where the lift is a sub-system of a complete lift system that includes the stationary or primary lift either having transferable lift pads or detatchable transferable lift pads and arms or detachable, transferable lift arm extensions. The stationary lift is designed to assist in the maneuvering, alignment, and position of the lift caddy beneath the frame or chassis of the vehicle under repair. Automated location of the lift caddy can be carried out by a use of a combination of proximate sensors, receives and transmitters, real-time video and signal feedback. This permits an operator to align and position the lift caddy, either manually or autonomously and position the lift caddy with respect to the primary lift. The lift arrangement may include alignment and positioning software, including a facility for remote operation. The stationary lift may contain an integrated database to store information (e.g., lift pad or arm location, vehicle position and weight distribution; vehicle height) which will allow the lift caddy to be positioned and located in a preferred position with a high degree of repeatability. The information in the database may also be used by the control system for autonomous operation, and allow for integration of machine learning, IoT (Internet of things) decision support software (DSS), and other useful functionalities. The database information may also be used to allow the stationary lift to autonomously or semi-autonomously engage the lift caddy during the transfer sequence (i.e., raise and lower the lift pad and/or arm; lock and unlock the lift pads and/or arms) The control systems may also be adapted to an existing lift design.

These and other objects, features, and advantages of the invention will become apparent from the following detailed description of a selected preferred embodiment, which is to be read in connection with the accompanying Drawing:

BRIEF DESCRIPTION OF THE DRAWING

FIG. 13 is an end elevation of the combination of the pivot lift arm and lift caddy clamp lift pad shown in engagement with the lift point of a vehicle.

FIG. 14 is a perspective view of the lift caddy clamp lift pad and pivot lift arm of this embodiment separated from one another.

FIGS. 17 and 18 are elevation and perspective views of the lift caddy lift pad assembly and pivot lift arm in a disengaged configuration.

DETAILED DESCRIPTION OF A PREFERRED EMBODIMENT

Figure 1:
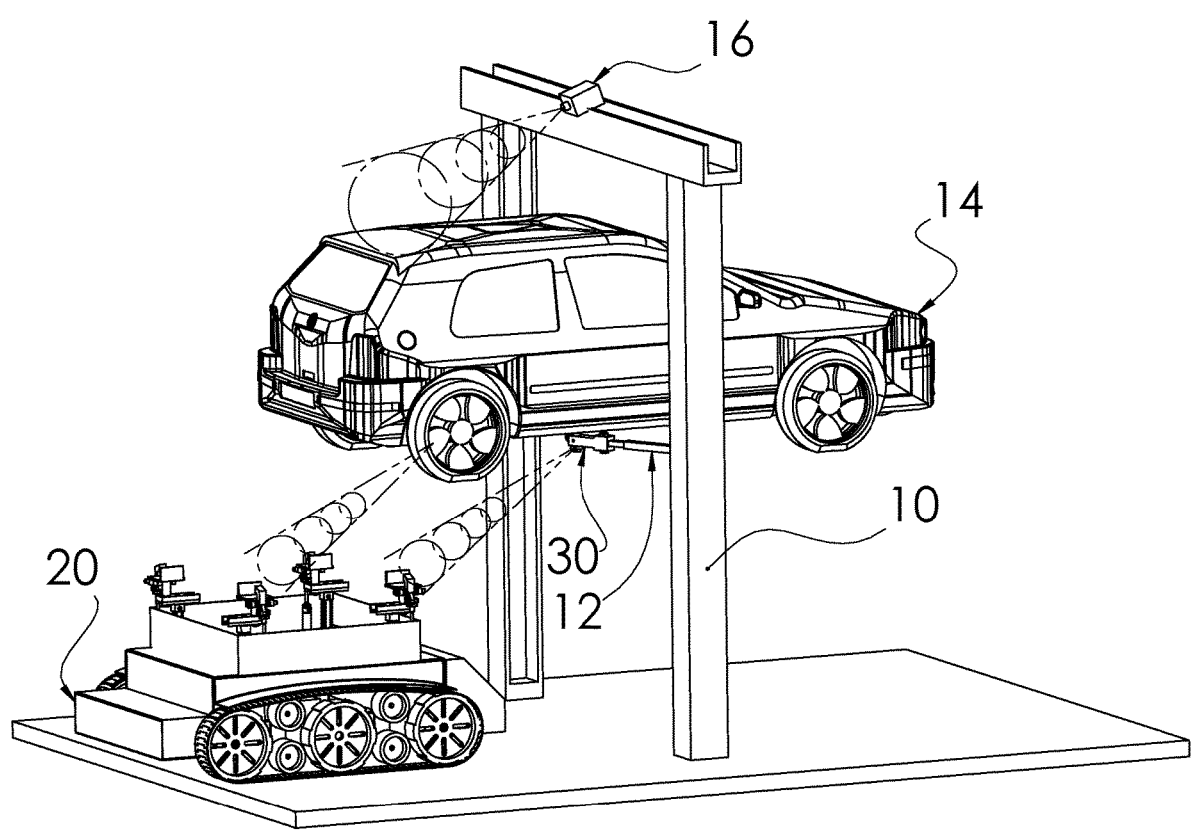
FIG. 1 and FIG. 1A are a perspective view and an elevation of a fixed primary lift or hoist that incorporates removable pivot lift arms, and a lift caddy employing a clamp lift pad assembly removably disposed upon the caddy lift according to an embodiment of this invention.
Figure 1A:
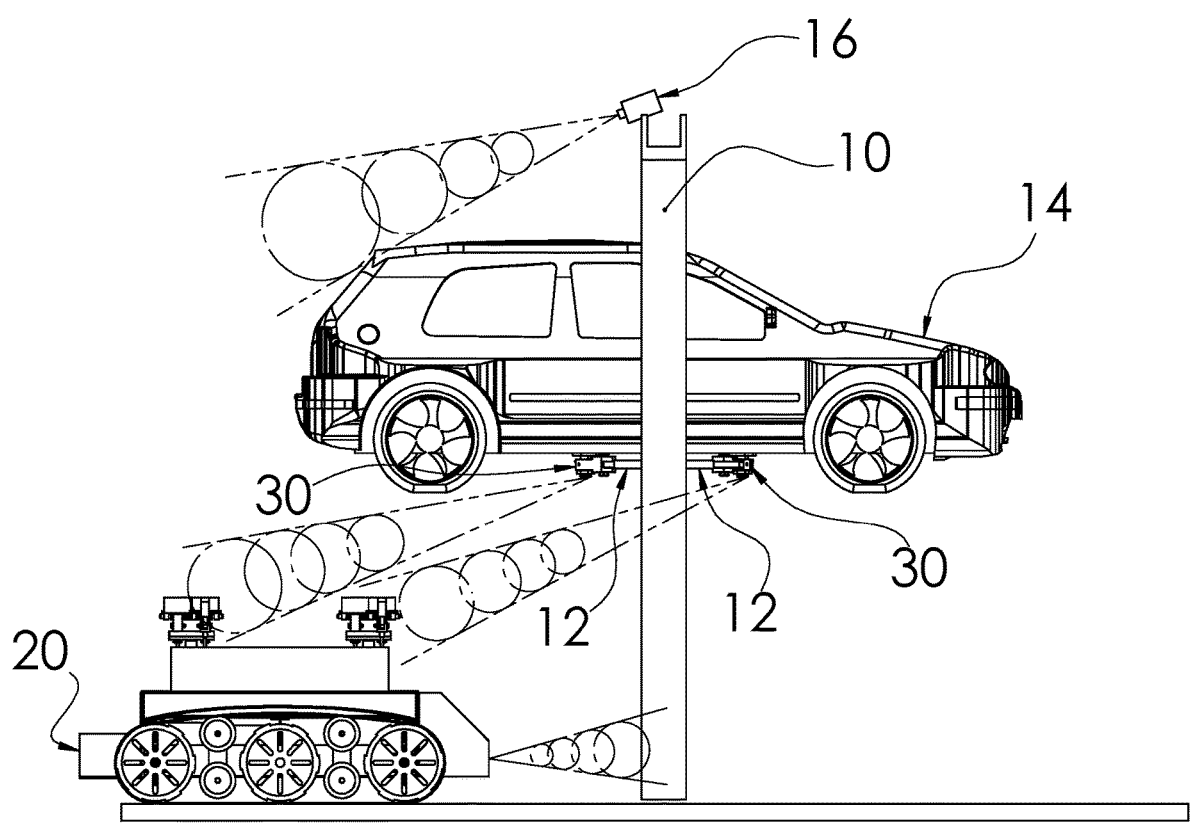
Figure 2:
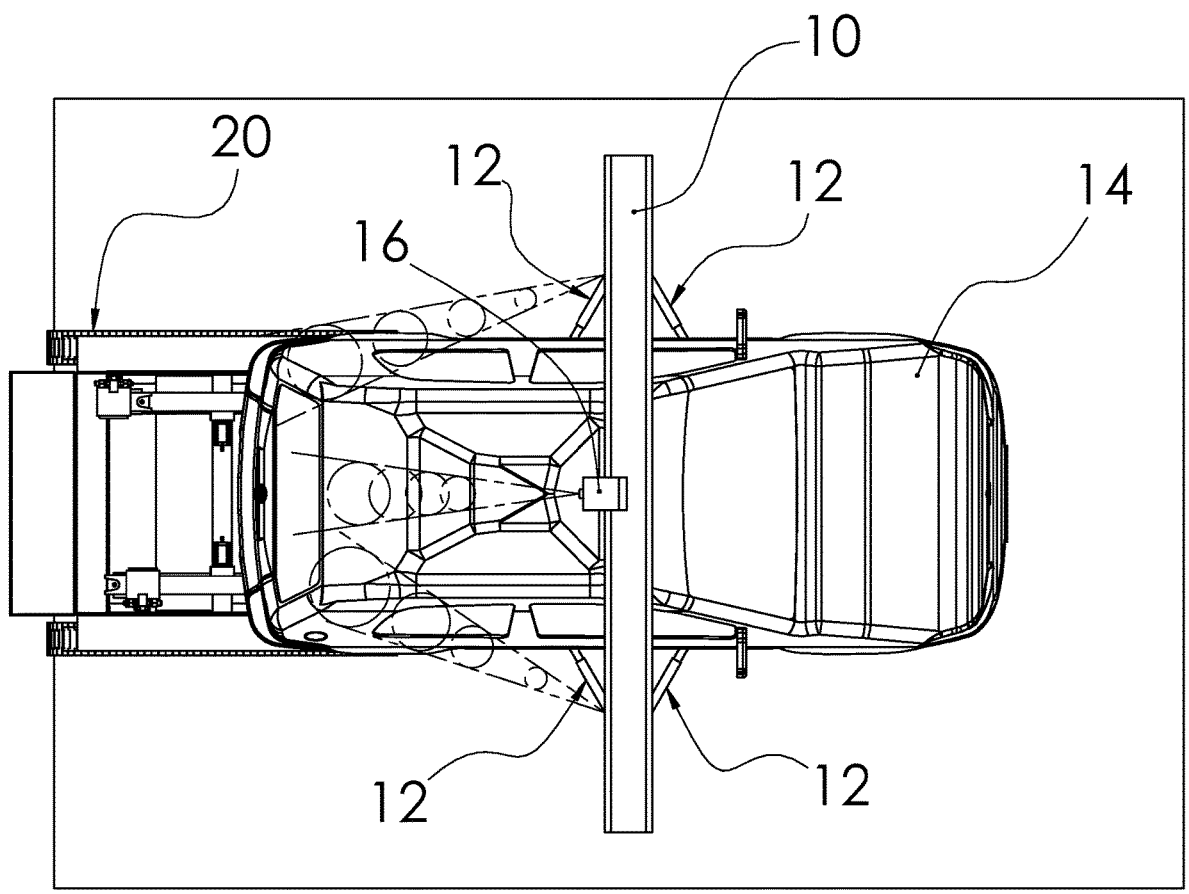
FIG. 2 is a top plan view thereof.

With reference to the Drawing Figures, and initially to FIGS. 1, 1A and 2, an automotive repair shop typically employs one or more primary lifts 10, each being positioned within a respective service bay for the purpose of lifting a vehicle above the floor of the repair bay to facilitate repair or maintenance of the vehicle. As shown, a typical primary or permanent lift 10 has two or more vertical lift posts that define the workspace around the vehicle; here there are two lift posts with each lift post having a pair of lift arms 12 that can be extended to position itself under a vehicle 14. Typically, lift pads are positioned at the distal or outer ends of the lift arms 12, and these are to be positioned at predetermined lift points on the body or chassis of the vehicle 14 so it can be lifted safely. In the embodiments of this invention, the lift pads are incorporated into removable load-bearing pivot arms 30 that are removable positioned at distal ends of the lift arms, as will be described. These pivot arms 30 are replaceable and interchangeable, and can be removed from associated sockets or receptacles in the lift arms, as discussed later. Pneumatic or hydraulic cylinders or equivalent actuator mechanisms in each of the lift posts move the lift arms 12 between lowered and elevated positions. As shown here, the primary lift 10 includes video imaging camera(s) 16, e.g. at the center of the cross-beam between the two lift posts, and/or at the positions of the lift arms 12. Additional proximity sensors and ultrasonic device assist in the maneuvering, alignment and position of the lift caddy 20 beneath the chassis of the vehicle 14 on the primary lift, which is carried out using wired or wireless controls. With this combination of video, audio, and other sensors, receivers, and transmitters, and other positioning equipment, the stationary lift allows an operator to align and position the lift caddy 20, and then can raise or lower the lift arms 12 and allow the lift caddy 20 to position itself beneath the vehicle and transfer the vehicle from the lift arms 12 of the primary lift to the caddy 20. The lift pads, e.g., the pivot arms 30 can then be detached from the primary lift arms 12 and secured into the corresponding lift mechanism of the lift caddy 20. Favorably, the primary lift 10 can have an integrated data base to store information, such as lift pad and lift arm location, vehicle position and weight distribution, vehicle height, etc., which permits the primary lift 10 and the mobile lift caddy 20 to work in concert for autonomous operation and allow for decision support software (DSS) to be employed. The data base information may also be used to allow for the stationary lift to work autonomously or semi-autonomously to engage the vehicle transfer caddy or mobile lift caddy 20 during a transfer sequence. The control systems may also be developed and adapted for using this technology with an existing design primary lift, without any loss of the novel and improvement aspects of this invention.

In keeping with the principles of this invention, a mobile lift caddy 20 is provided as illustrated, e.g., in FIGS. 1 and 2, and later in FIGS. 8, 8A, 9 and 9A. The lift caddy 20 has a main body or chassis that is dimensioned to fit into the space defined by the primary lift posts, and has a mobility drive arrangement, which can be a tracked drive or wheel drive. The mobile lift caddy 20 has a set of four lift arms or posts 24 which emanate from a lift arm control within the vehicle. Each of these caddy lift arms can be configured so as to accept a mating portion of the lift pad arrangements on the primary lift arms and lift out the lift pads or extension arms with the vehicle being supported on them, so that the vehicle can be transported on the caddy to another location, which can be another repair bay or can be a holding area. Alternatively, the caddy lift arms or posts and lift pad arrangement can be configured to remain separate from the primary lift arm lift pads, so that the lift caddy 20 can remove the vehicle 14 from the primary lift 10 with or without transfer of the primary lift arm and lift pad arrangements from the primary lift arms.

Figure 3:
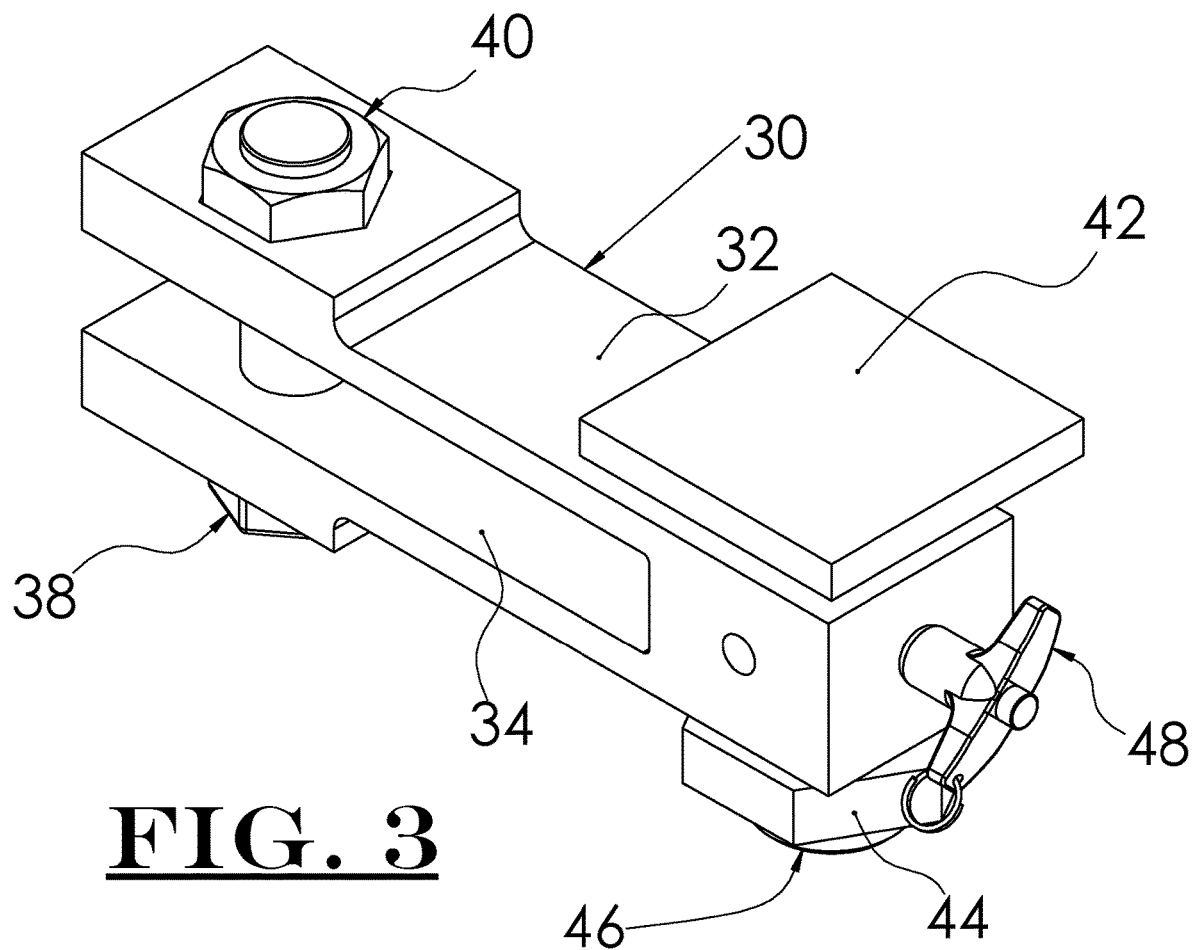
FIG. 3 is a perspective view of a removable pivot lift arm according to one embodiment of the invention.
Figure 3A:
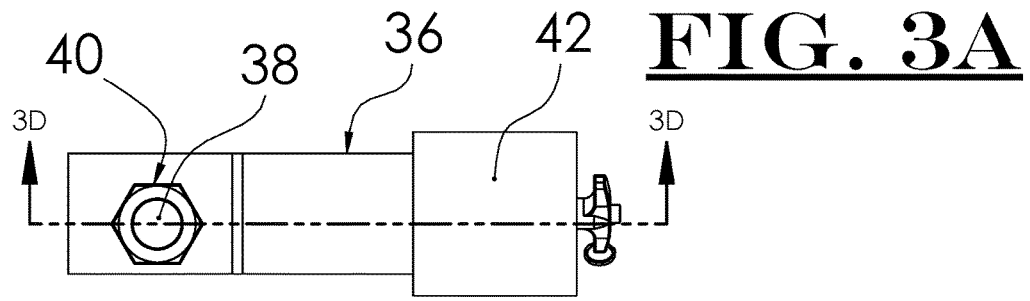
FIGS. 3A, 3B, and 3C are a top plan view, side elevation, and end view thereof, respectively.
Figure 3B:
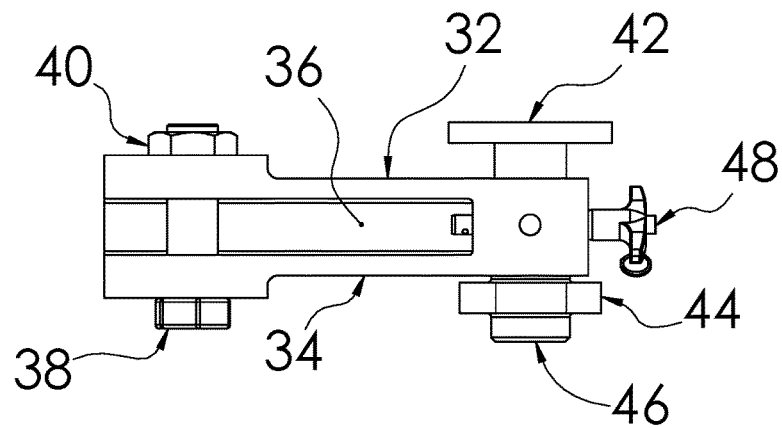
Figure 3C:
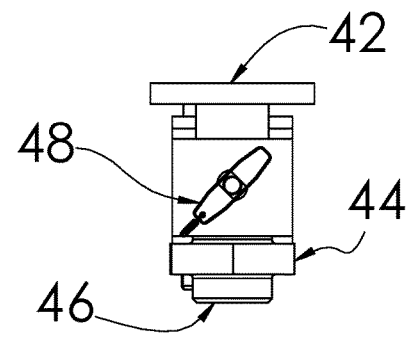
Figure 3D:
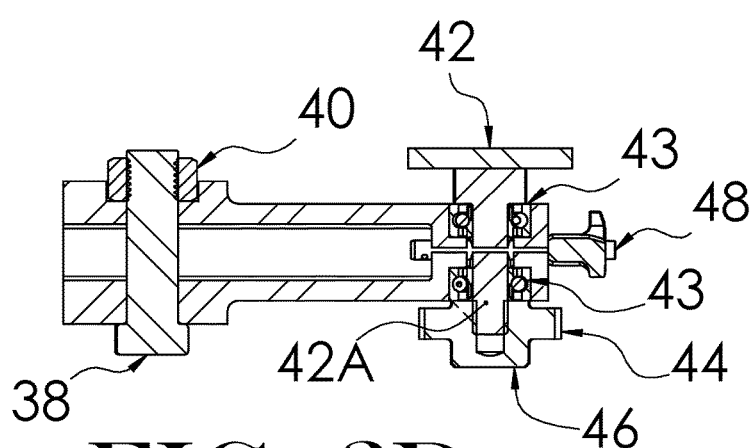
FIG. 3D is a section view taken at line 3D-3D of FIG. 3A

An embodiment of the pivoting lift arm attachment 30 according to this invention is shown in perspective in FIG. 3 and in other aspects in FIGS. 3A, 3B, 3C and 3D. The main portion of the pivoting lift arm attachment 30 is formed of an elongated upper plate 32 and a parallel elongated lower plate 34, these being joined by a web 36 along one side (hidden in some views). A pivot arm retaining pin or lock pin 38, which has male threads at an upper end, is fitted into a bore in proximal ends of the upper and lower plates 32 and 34, and has a hex head at its lower end. This pin is used to fasten the lift arm attachment 30 onto the distal end of an associated one of the primary lift arms 12. A hex nut 40 with female threads sits in a hexagonal recess in the proximal end of the upper plate 32 and receives the threaded end of the lock pin 38. A lift pad assembly is situated at the distal end of the upper and lower plates 32, 34, with a lift pad 42 adapted for bearing the weight of the vehicle 14 at a given lift point. In this embodiment the lift pad 42 is generally a flat square, although the specific shape is not critical. The lift pad assembly includes a vertical shaft 42A that passes through a bearing 43 within one or both of the distal ends of the upper and lower plates 32, 34, as shown in cross section in FIG. 3D. A receiver member 44 is fitted onto the lower end of the shaft 42A that emerges below the lower plate 34. This has a hexagonal portion and a generally cylindrical tip portion 46 that serves as a receiver to seat into a mating load bearing member on the lift arm or lift post of the lift caddy 20 in the case where the pivoting lift arm attachment 30 becomes detached from the associated lift arm 12 and remains with the vehicle 14 that is being repaired when it is transferred to the lift caddy 20.

Figure 4:
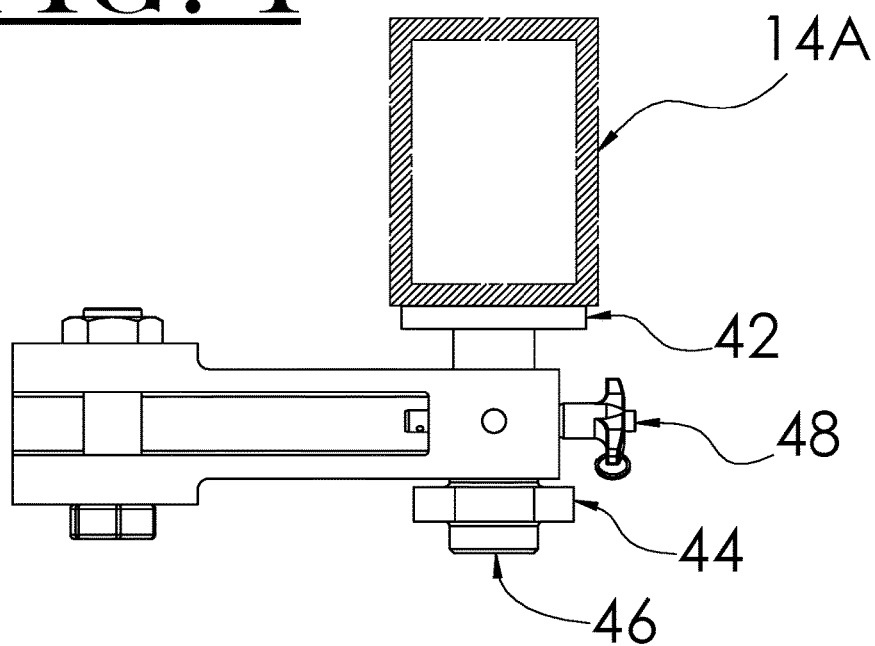
FIG. 4 is an elevation showing support of a vehicle at a lift point thereof.
Figure 5:
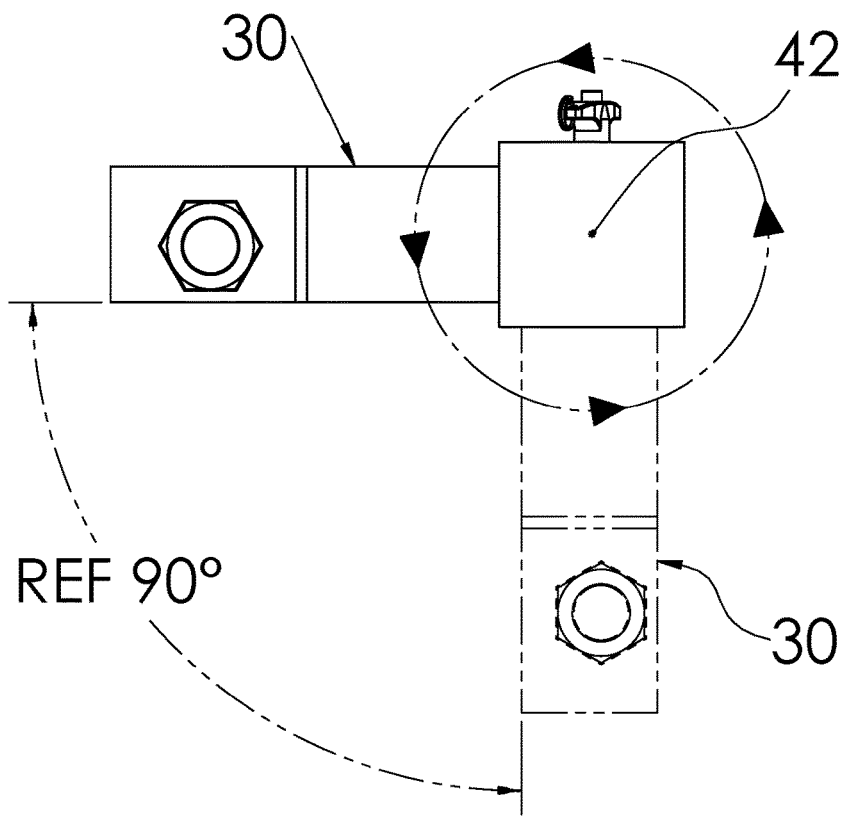
FIG. 5 is a top plan for explaining the pivot motion of the pivot lift arm of this invention.
Figures 6, 6A, 6B:
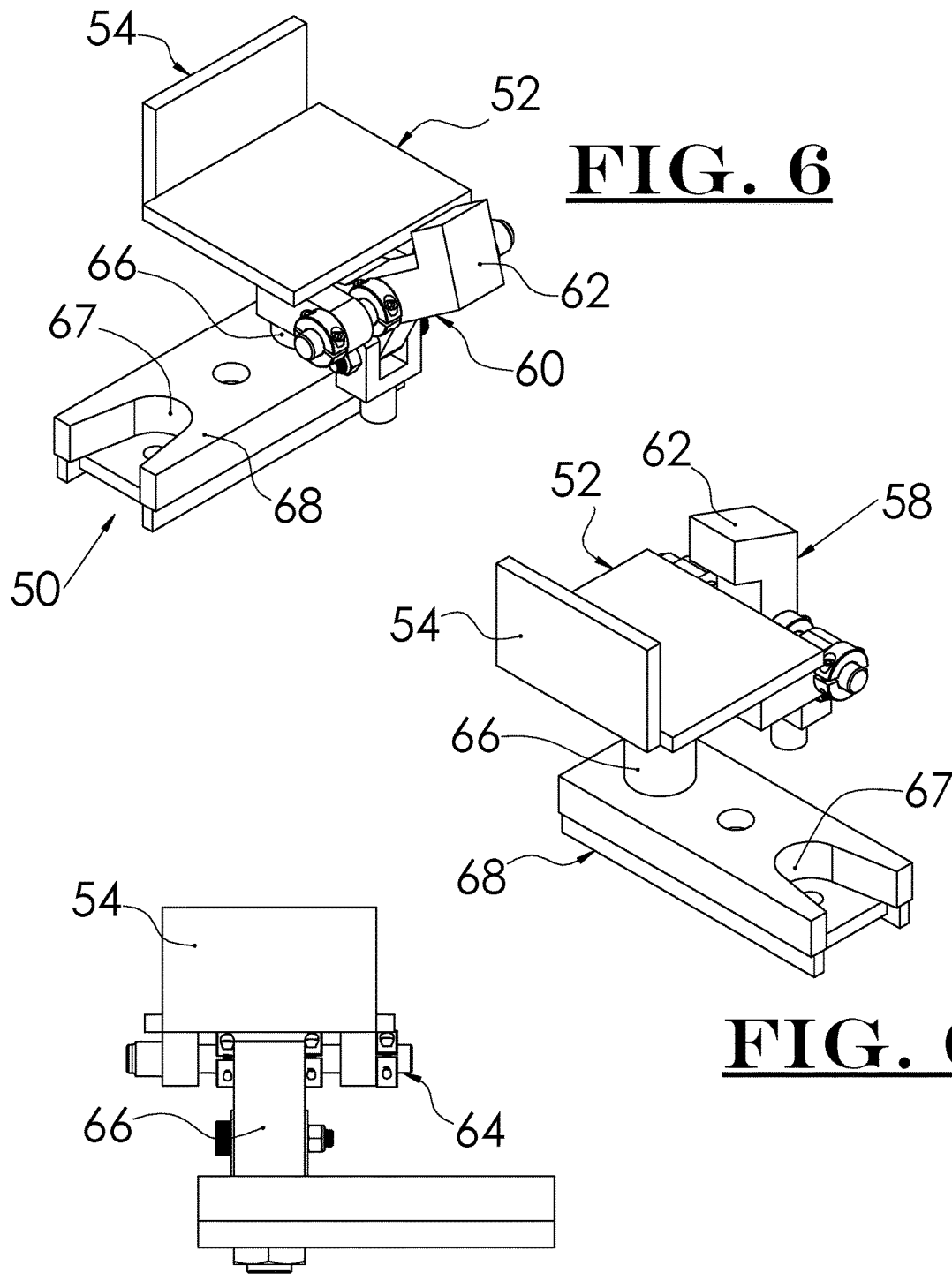
FIGS. 6 and 6A are perspective views, respectively, of the lift caddy clamp lift pad of an embodiment of this invention, in unclamped and clamped positions, respectively.
FIGS. 6B, 6C and 6D are front side, end, and rear side elevations of the lift caddy clamp lift pad of this embodiment.
Figure 6C:
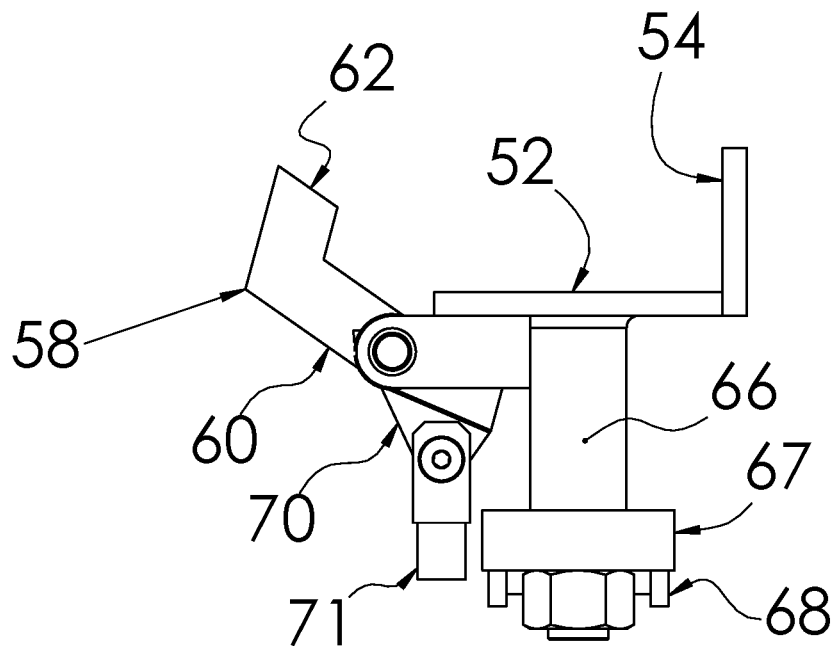
Figure 6D:
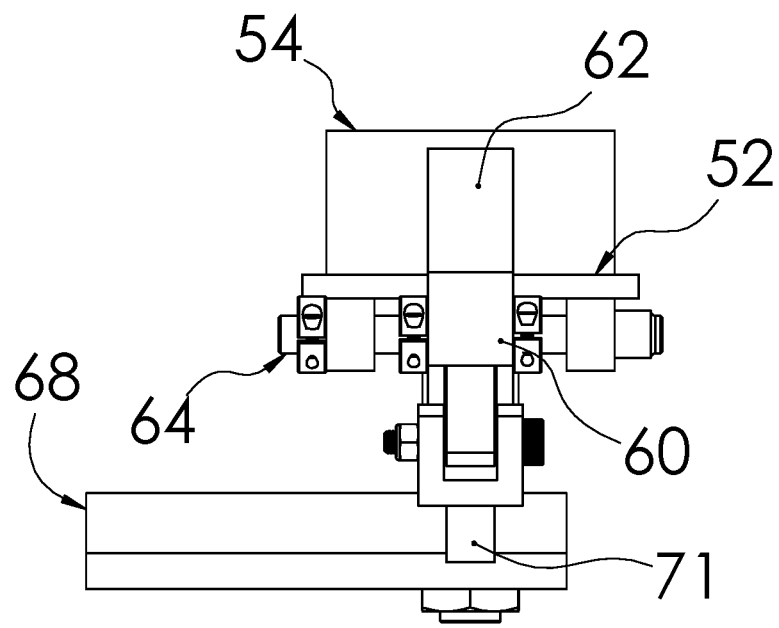

FIG. 4 shows a portion 14A of the vehicle frame being supported on the lift pad 42 of the lift arm attachment 30 when the lift arm attachment 30 is fastened onto the end of an associated primary lift arm (not shown). The pivot lift arm attachment 30 can be positioned onto the receptacle provided on the lift caddy arm or post 24. The pin 38 can be removed from the proximal end of the associated primary lift arm 12, and the attachment 30 can swing about the axis of the shaft 43A, generally as shown in FIG. 5.

A clamp lift pad assembly 50, one of which in embodiments of this invention is favorably mounted onto each of the lift arms or posts 24 of the lift caddy 20, is shown in detail in FIG. 6 and FIGS. 6A to 6D. The clamp lift pad assembly 50 includes a clamp lift pad 52, here represented as a horizontal, generally square metal plate, on which the chassis of the automobile or other vehicle 14 is to be supported when the vehicle is carried on the lift caddy 20. The lift pad has a vertical wall 54 rising from a first edge of the lift pad and a second edge opposite the first edge. A generally L-shaped or Gamma-shaped (F-shaped) clamp member 58 is positioned at the second edge, formed of a bar portion 60 which serves as a rocker, and a finger or projection 62 that projects from the bar portion 60 towards the vertical wall 54, so as to bear on a portion of the vehicle chassis when the clamp member 58 is in the closed or clamped position. A yoke member 64 is supported at the lower side of the lift pad 52, or onto a base member beneath the lift pad, and this yoke member 64 has a portion extending beyond the second edge of the lift pad 52. The bar portion 60 of the clamp member is journaled onto that portion of the yoke member, so as to pivot about a horizontal axis in the vicinity of the second edge 56. In this embodiment, the lift pad 52 is supported on a vertical post 66 that is in turn supported on a notched horizontal base plate 68. Here the notch is a generally V-shaped recess 68A at the right side of the base plate 68 in the illustrations of FIGS. 6 and 6A. The recess is configured to accommodate the flange 44 and cylindrical lower tip member 46 of the pivoting lift arm attachment 30, so as to facilitate transferring the vehicle 14 and pivoting lift arm attachment 30 between the primary lift 10 and the lift caddy 20.

Figure 7:
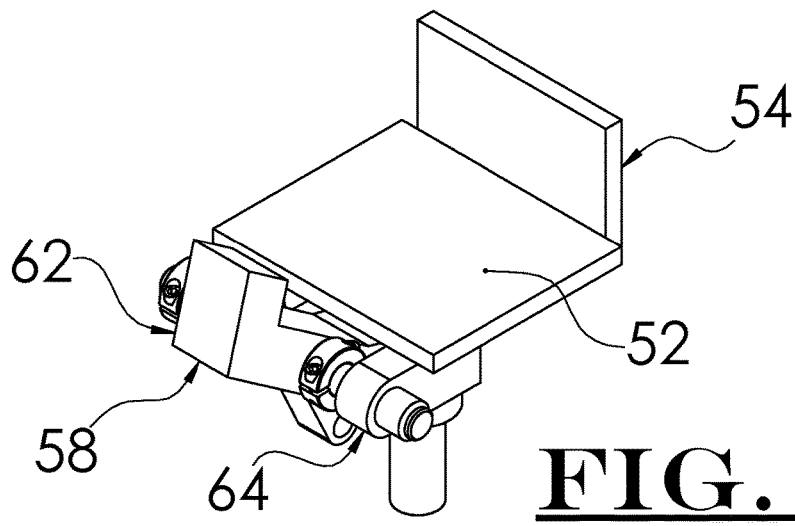
FIGS. 7, 7A and 7B are perspective, side and end elevations of another lift caddy clamp lift pad.
Figure 7A:
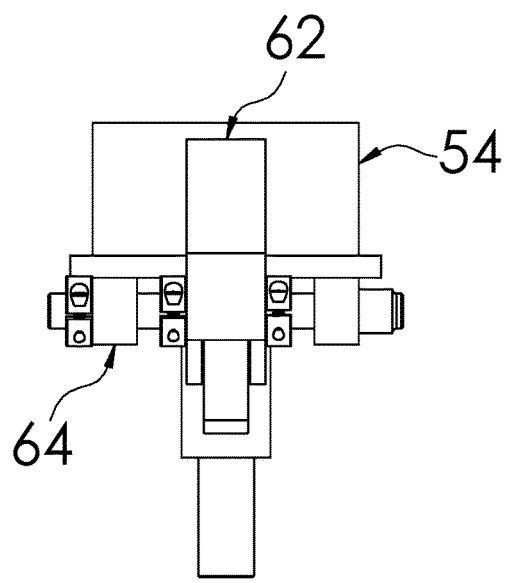
Figure 7B:
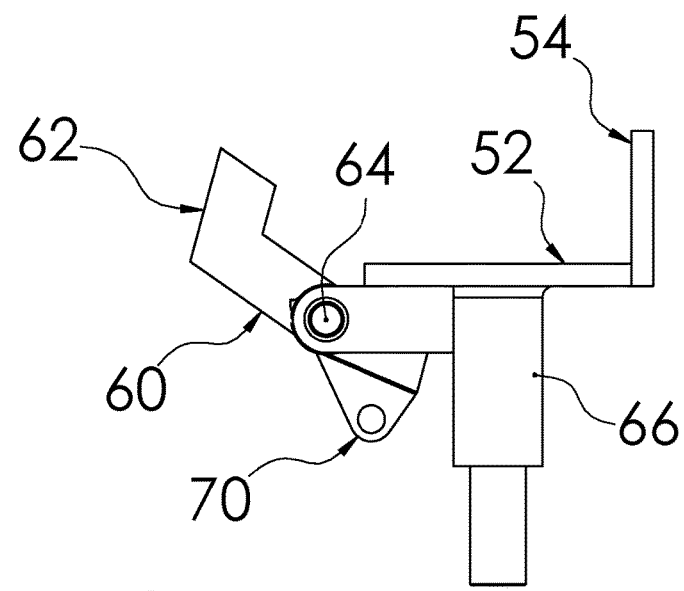
Figure 8A:
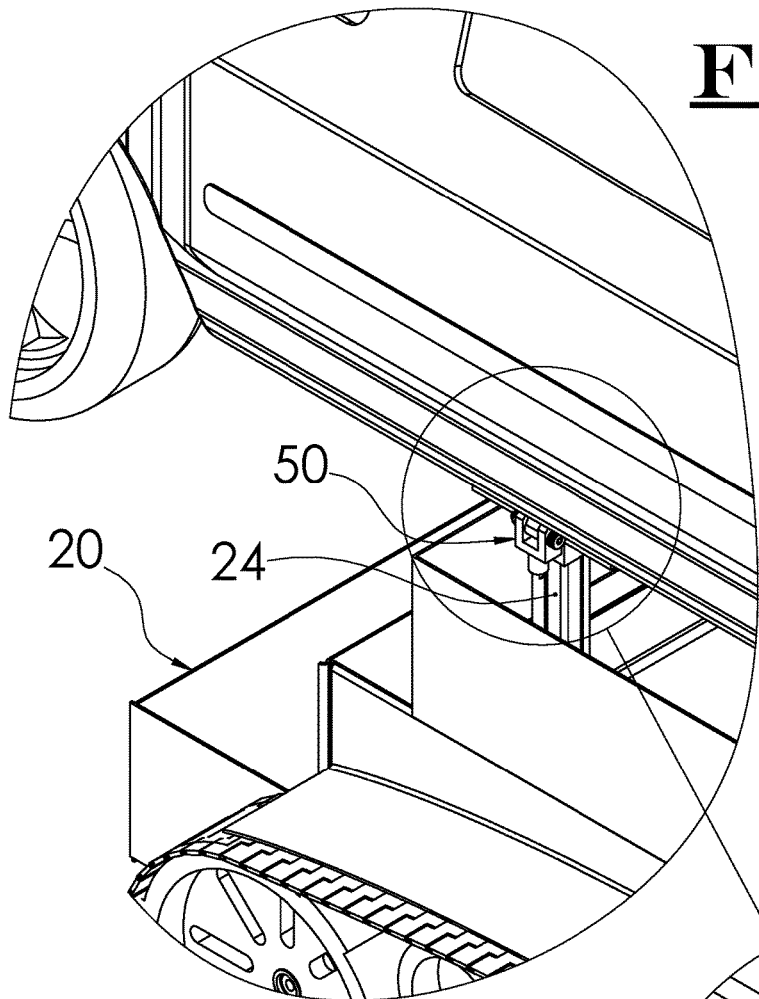
FIG. 8 is an enlargement of a portion of the lift caddy as shown in FIG. 8A.
Figure 8:
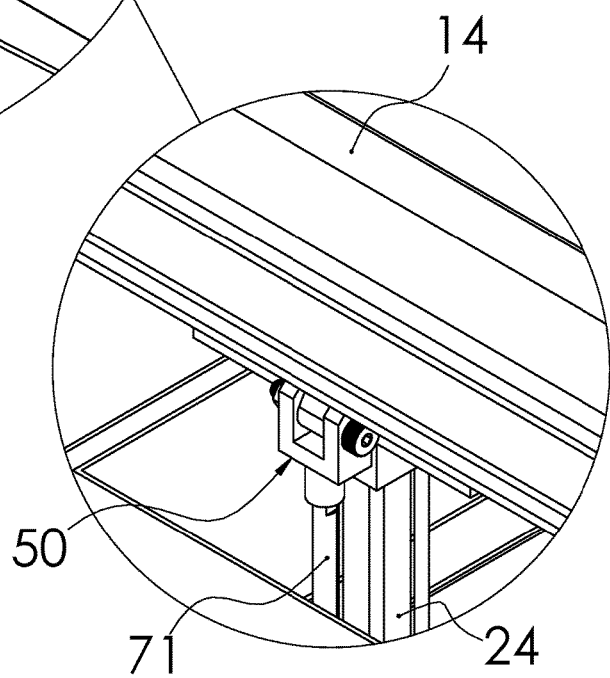
Figure 9A:
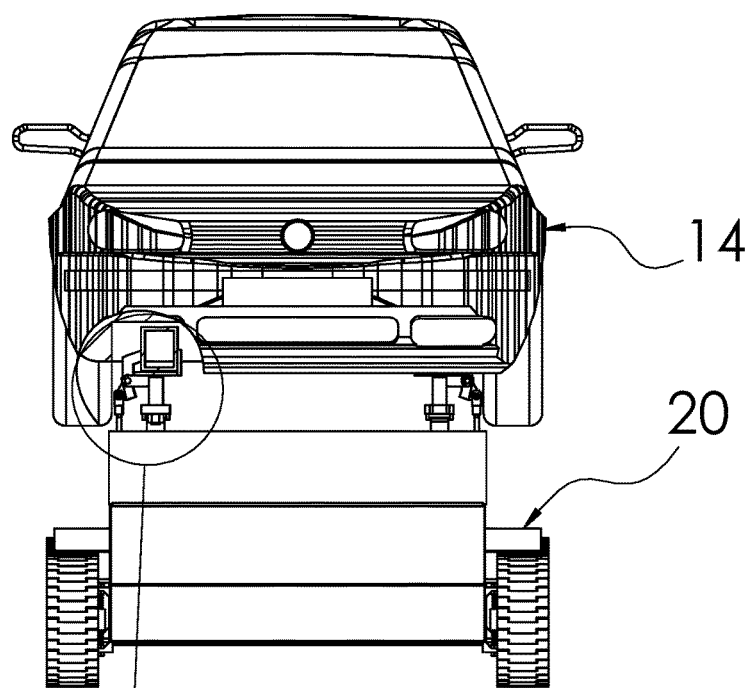
FIG. 9 is an enlargement of a portion of the lift caddy clamp lift clamp shown in FIG. 9A.
Figure 9:
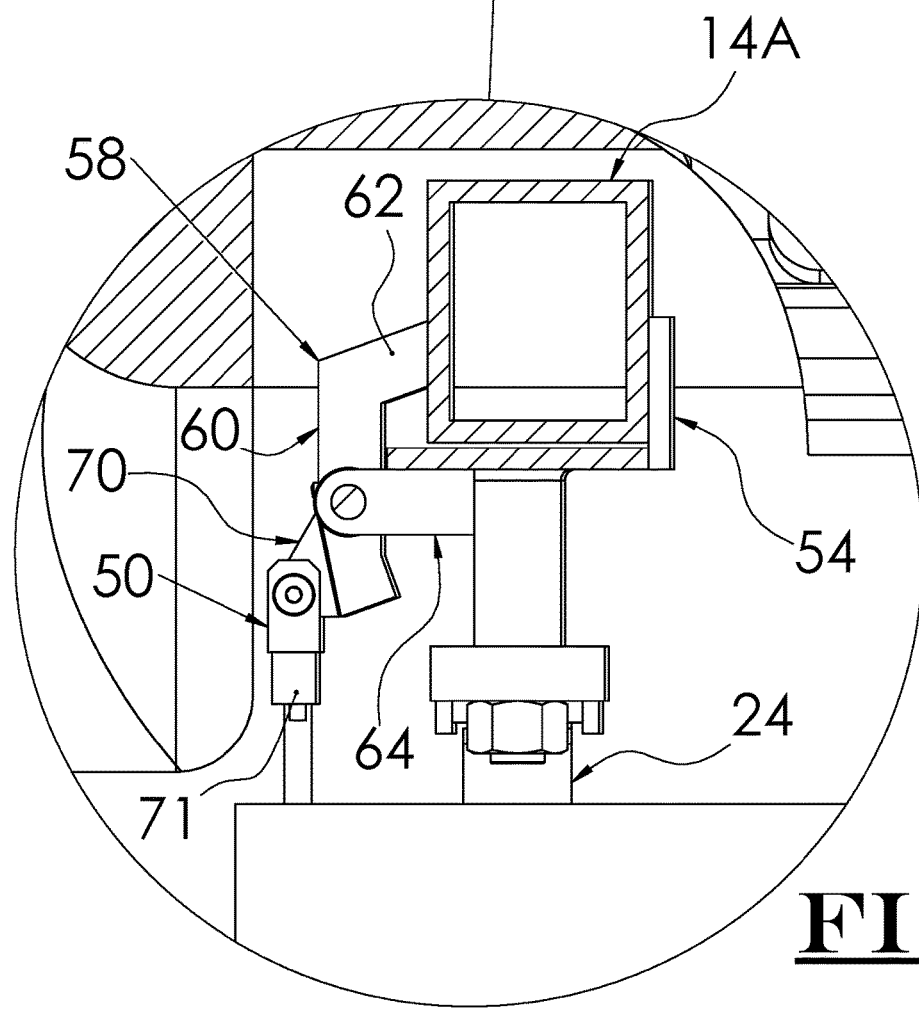

An apertured fin member 70 is provided at the lower end of the bar portion 60 of the clamp member, for mounting to a rod or extension member 71 of a hydraulic cylinder or other linear actuator of the lift caddy, which serves to move the clamp member between its clamped and unclamped positions. FIG. 7, in connection with FIGS. 7A and 7B illustrate an alternative embodiment of the clamp lift pad in which the notched plate 68 is omitted and the vertical post 66 that supports the lift pad 52 can extend directly into the lift caddy's lift arm or post 24. Here, elements that correspond to elements in FIGS. 6 and 6A to 6D are identified with the same reference numbers, and a description thereof need not be repeated. The clamping action of the clamp lift pad assembly 50 can be explained with reference to FIGS. 8 and 8A and with additional reference to FIGS. 9 and 9A. Here, the lift pad 52 is positioned to support a frame member 14A of the vehicle 14 when being carried on the lift caddy, and the clamp lift pad assembly 50 is supported above an associated lift arm or post 24. The actuator rod 71 extends upwards from an associated actuator (not shown) within the lift caddy to the attachment fin 70. The clamp member 58 is rocked to its closed or clamped position with the finger 62 bearing against frame member 14A and urging the same securely against the vertical wall 54, with the cylindrical lower tip member 46 being seated within the V-shaped notch 67 of the base plate 68, This keeps the vehicle securely on the lift caddy when the vehicle is being transported to or from the primary lift.

The interaction of the pivotal lift arm attachment 30 and the clamp lift pad assembly 50 can be explained with reference to the perspective view of FIG. 10 in further reference to the corresponding elevations of FIGS. 10A, 10B and 10C.

Figure 10:
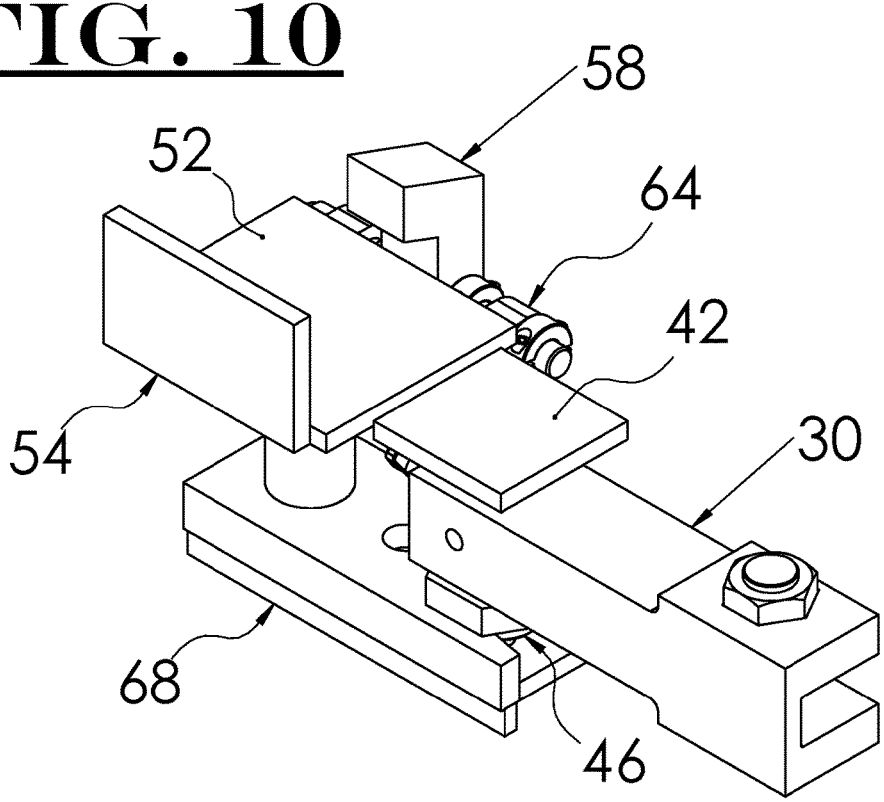
FIG. 10 is a perspective view of the pivot lift arm and lift caddy clamp lift pad in combination.
Figure 10A:
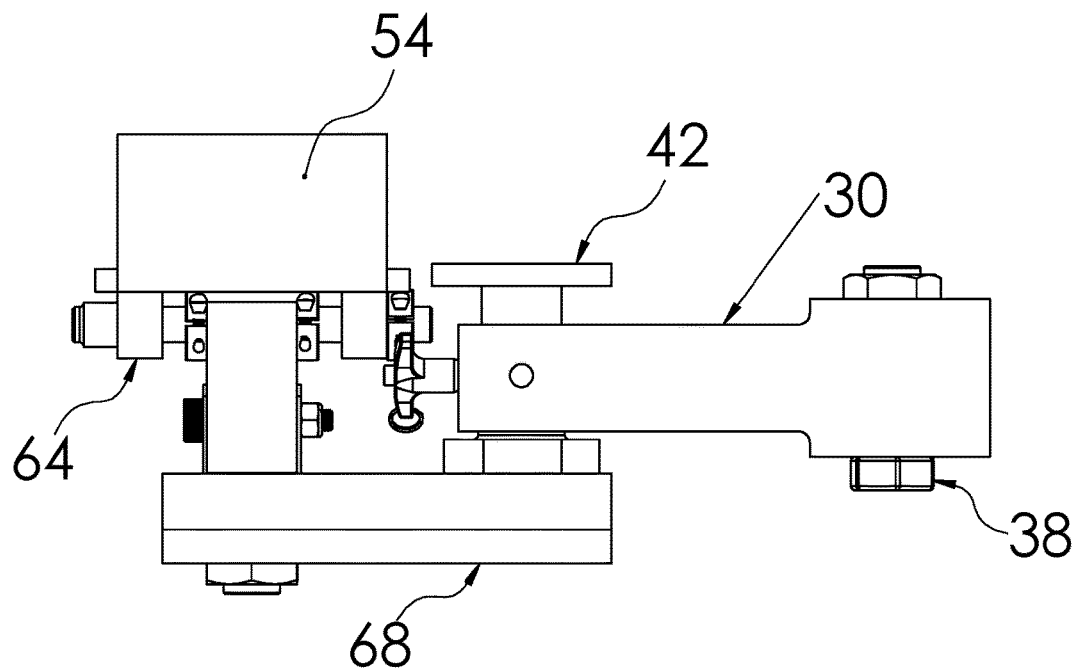
FIGS. 10A, 10B and 10C are a side view, end view and second side view, respectively, of the pivot lift arm and lift caddy clamp lift pad in combination, of FIG. 10.
Figures 10B, 10C:
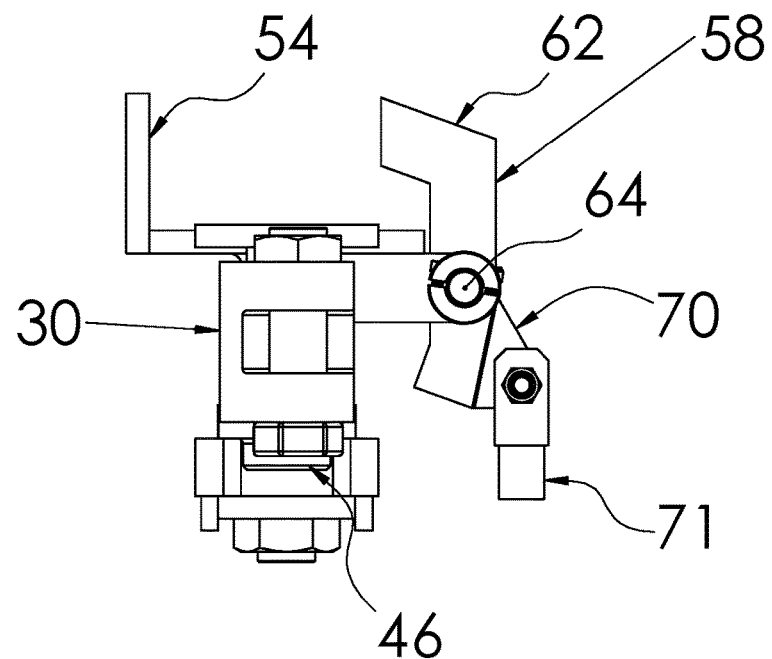
Figure 11:
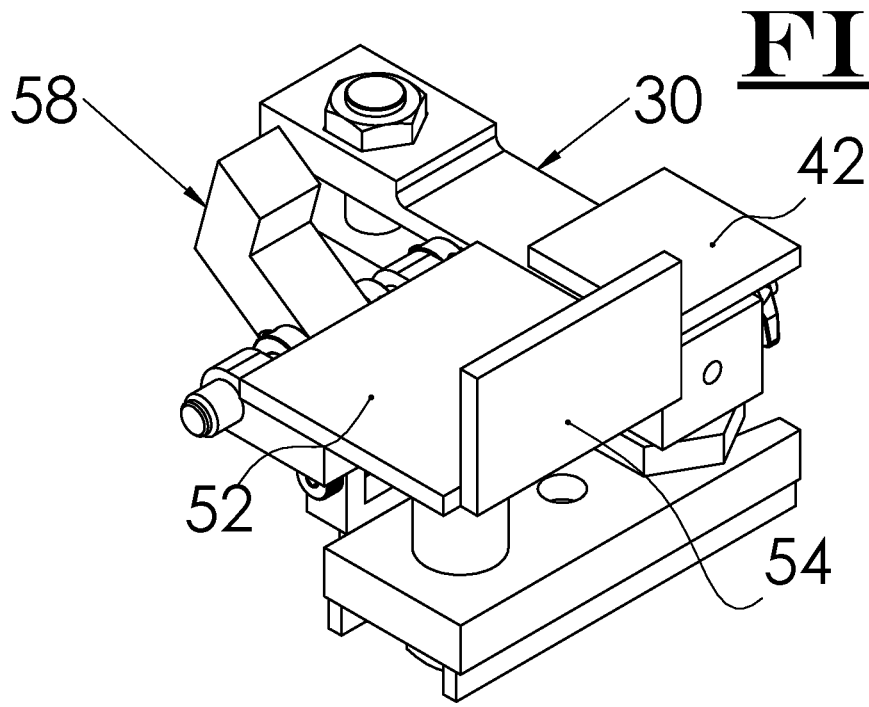
FIGS. 11 and 12 are perspective views of the pivot lift arm and lift caddy clamp lift pad, of this embodiment shown in the unclamped position and clamped position, respectively.
Figure 12:
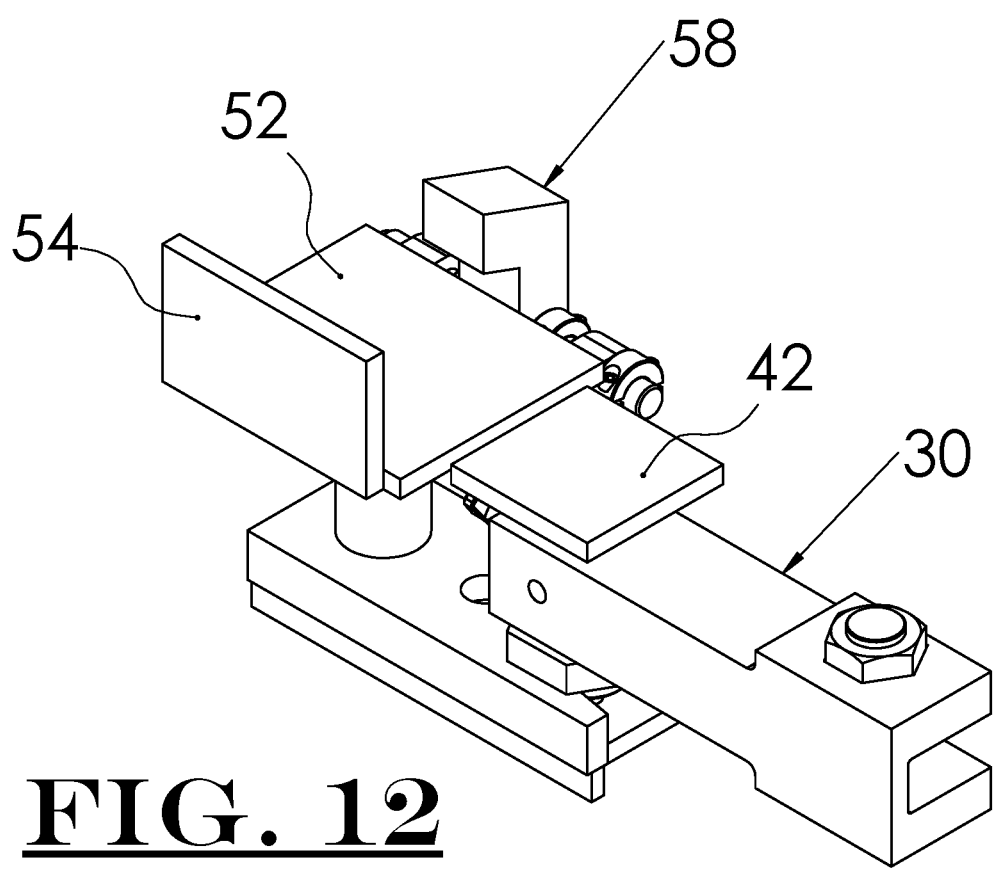

As shown in the perspective view of FIG. 10, when the primary lift arms are lowered towards the lift caddy, and with the lift caddy properly positioned under the primary lift, the male tip portion 46 seats into the rounded portion of the notch 67 and the hex ring portion 44 is supported on a shoulder at the notch 67. This means both the clamp lift pad 52 and the lift arm lift pad 42 are in contact with a lift point of the vehicle, and both of these support the vehicle so the lift arm attachment 30 can be removed from the associated lift arm after removing the associated lock pin 38. Then as shown in FIGS. 10A to 10C, the lift arm attachment 30 and clamp lift pad assembly 50 remain interlocked in place on the vehicle, and supported from below by the lift arms 24 of the vehicle lift caddy 20 (not shown here). With the vehicle in place, the actuator (not shown here) moves the clamp to and from an unclamped position (FIG. 11) to a clamped position. FIG. 13 shows the clamp member 58 urged against the automobile frame member 14A to clamp the vehicle securely above the lift caddy. Once the caddy has removed the vehicle from the zone of the primary lift, the pivoting lift arm member 30 can be removed as shown in FIG. 14, or left in place.

In a different configuration, the pivot arm assemblies may remain on the primary lift arms 12 or may be transferred to the lift caddy 20.

Figure 15:
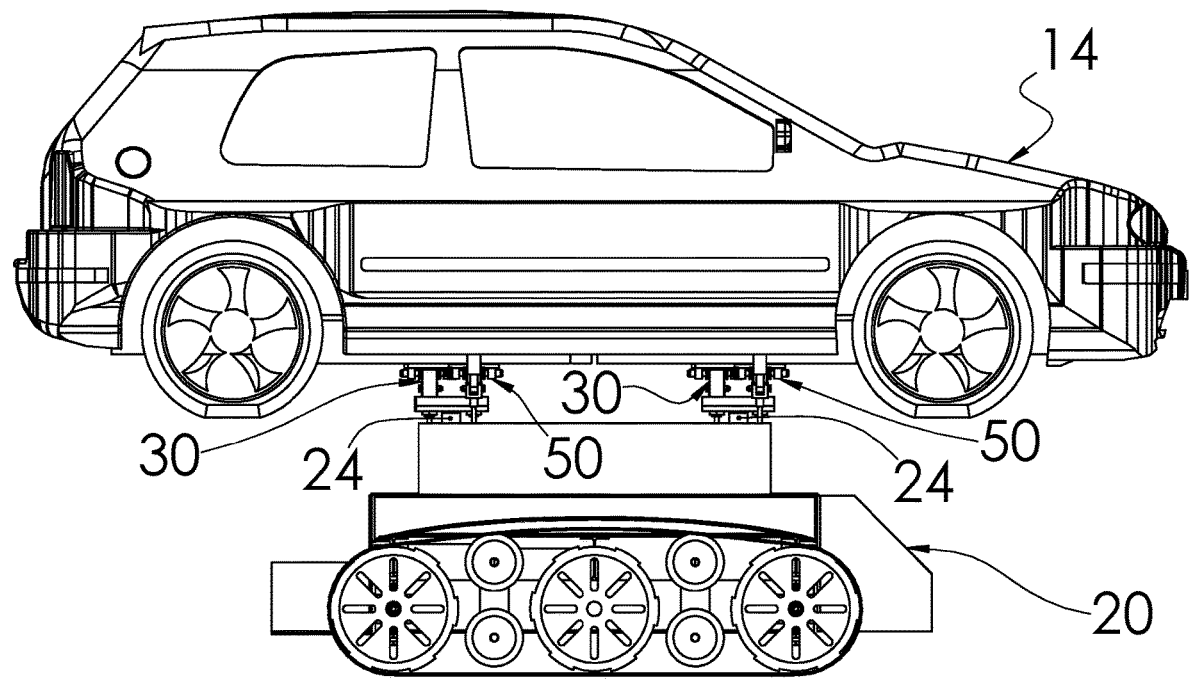
FIGS. 15 and 16 are side and end elevations of the lift caddy supporting a motor vehicle on the pivot lift arm and lift caddy clamp lift pad assemblies of this embodiment.
Figure 16:
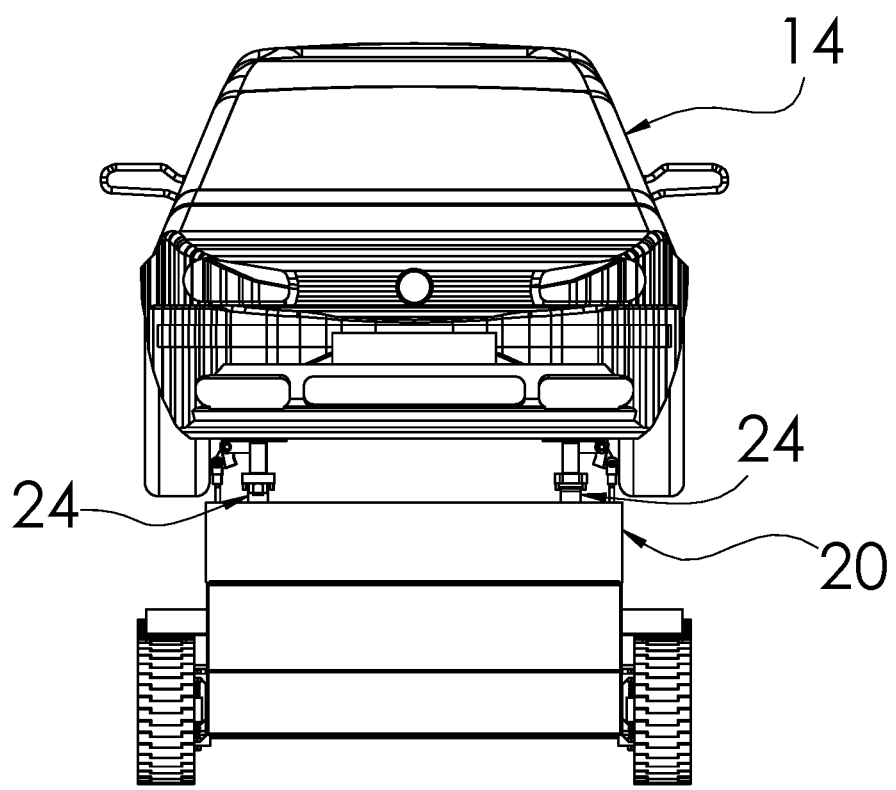

With the vehicle 14 held in place on the lift caddy 20 as shown in FIGS. 15 and 16, the lift arm attachment 30 and clamp lift pad assembly 50 are each in place upon a respective caddy lift arm or post 24, with the vehicle 14 clamped securely at four lift points on the vehicle chassis.

Figure 19:
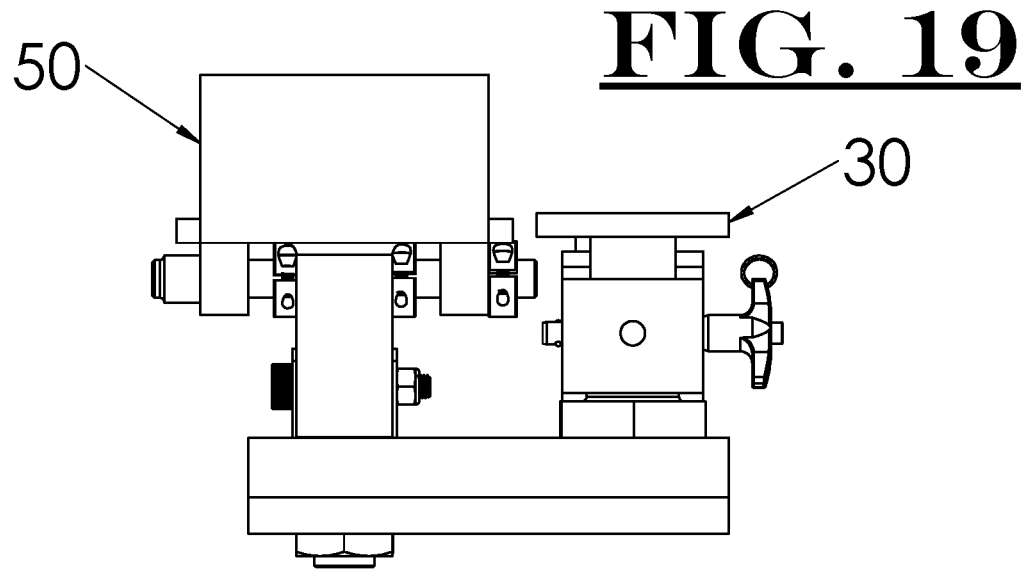
FIGS. 19 and 20 are elevation and perspective views of the lift caddy lift pad assembly and pivot lift arm in an engaged configuration.
Figure 20:
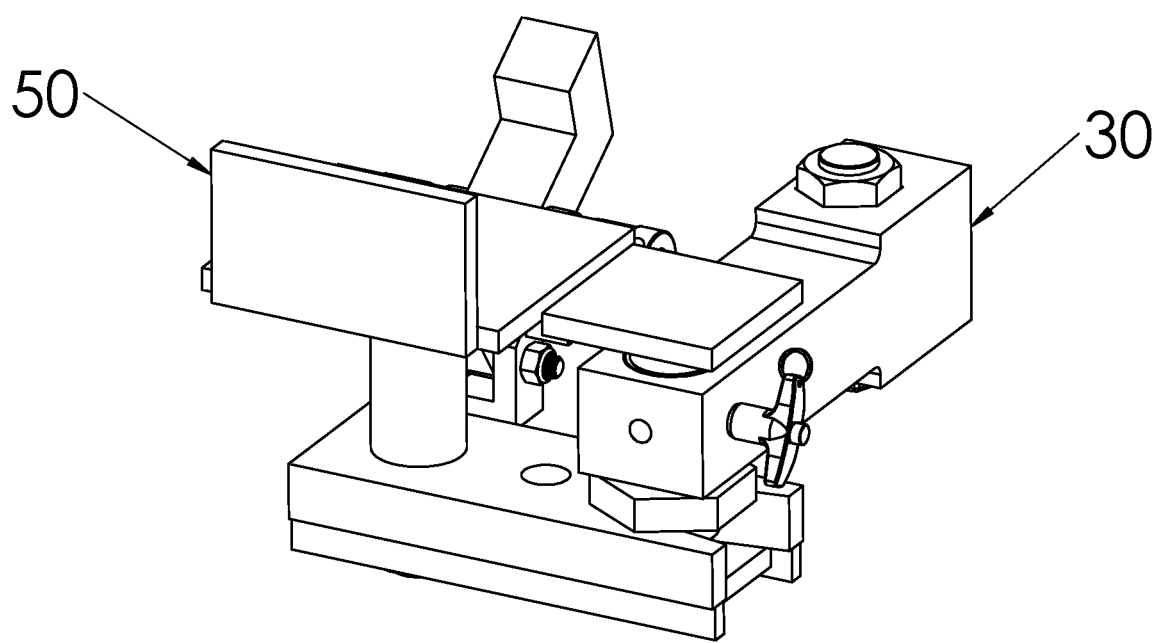

FIGS. 17 and 18 show the lift arm attachment 30 and clamp lift pad assembly 50 in a disengaged configuration, and FIGS. 19 and 20 show the attachment 30 and assembly 50 in their engaged configuration.

While the present invention has been described with reference to certain preferred embodiments, it should be understood that the invention is not limited to any particular embodiment. Rather, many modifications and variations would present themselves to persons skilled in the art without departure from the scope and spirit of this invention, as defined in the appended claims.

What is claimed is:

1. A removable load bearing pivot arm adapted to be attached removably onto an end of a lift arm of a stationary vehicle lift, comprising:
    an elongated pivot bar member having a proximal end and a distal end, with said proximal end being adapted to fit removably onto the end of said lift arm;
    a pivot lock pin being removably mounted into a bore formed in the proximal end of said pivot bar member, including male threads at one end and a grippable surface at the other end thereof to permit the pivot locking pin to be turned;
    a female threaded member mounted on a proximal end of the elongated pivot bar member and adapted for receiving the male threads at said one end of the pivot locking pin; and
    a lift pad assembly positioned at the distal end of said elongated pivot bar member, and including a rotary bearing contained in said distal end of a shaft supported in the rotary bearing, a load bearing plate mounted atop an upper end of said shaft; and a pivot pad lift receiver mounted at a lower side of said elongated pivot bar member and adapted for receiving a lift member of a mobile lift caddy.

2. The removable load bearing pivot arm according to claim 1, wherein said elongated pivot bar member is formed of an upper elongated plate, a lower elongated plate, and a side member joined to the upper and lower elongated plates and defining an elongated open channel extending from said proximal end to said a distal end of said elongated pivot bar member.

3. The removable load bearing pivot arm according to claim 2, wherein said female threaded member is formed at a proximal end of said upper elongated plate.

4. The removable load bearing pivot arm according to claim 1, further comprising a removable retaining pin removably inserted into a bore formed in the distal end of said elongated pivot bar member for releasably locking the shaft against rotation.

5. The removable load bearing pivot arm according to claim 1, wherein said pivot pad lift receiver includes a lower generally cylindrical stub member adapted to fit into a female receptacle on the lift member of said mobile caddy.

6. The removable load bearing pivot arm according to claim 5, wherein said pivot pad lift receiver further includes a disk member above said generally cylindrical stub member and adjacent therewith, having a diameter greater than said generally cylindrical stub member.

7. The removable load bearing pivot arm according to claim 6, wherein said disk member includes one or more flat faces on a peripheral wall thereof and adapted for receiving a turning tool.

8. The removable load bearing pivot arm according to claim 1, wherein said proximal end of said upper elongated plate includes a hexagonal recess, and a hex nut removably disposed therein.

9. The removable load bearing pivot arm according to claim 1, wherein said shaft extends through the distal end of said elongated pivot bar member, and said pivot pad lift receiver is mounted on an end of said shaft.

10. A clamp lift pad assembly removably disposed upon a caddy lift arm of a mobile lift caddy that is configured for removing a vehicle from a primary lift and carrying such vehicle to a location away from the primary lift, the primary lift having a plurality of lift arms; said clamp lift pad assembly including: a base member supported on an associated caddy lift arm for engaging a vehicle on said primary lift; a horizontal pad member supported on said base member, having first and second side edges opposite one another; a vertical wall member affixed on the first side edge of said horizontal pad member; a clamp yoke affixed to said base member beneath said horizontal pad member, having a journal end extending to or past said second side edge; a pivotable clamp member having a bar portion journaled in said clamp yoke at said journal end thereof; a protrusion extending from one end of said bar member towards said vertical wall member when said bar member is rotated to an engaged position; and an actuator member coupled to an opposite end of said bar member controllably rotating said pivotable clamp member between said engaged and disengaged positions.

11. The clamp lift pad assembly according to claim 10 wherein said clamp base member includes a notched plate with a notch at one end thereof adapted to accommodate a removable load bearing pivot arm that is attached to one end of an associated lift arm of the primary lift.

12. The clamp lift pad assembly according to claim 10 wherein said actuator member is mounted on said base member.

13. The clamp lift pad assembly according to claim 10 wherein said base member includes a post upon which said horizontal pad member is affixed.

14. The clamp lift pad assembly according to claim 10 wherein said bar member has a generally gamma shaped profile.

\* \* \* \* \*